United States Patent
Wu et al.

(10) Patent No.: US 9,830,416 B2
(45) Date of Patent: Nov. 28, 2017

(54) METHOD FOR ANALOG CIRCUIT PLACEMENT

(71) Applicant: AnaGlobe Technology, Inc., Hsinchu (TW)

(72) Inventors: I-Peng Wu, Taipei (TW); Hung-Chih Ou, Taipei (TW); Yao-Wen Chang, Taipei (TW); Yu-Tsang Hsieh, Hsinchu County (TW)

(73) Assignee: AnaGlobe Technology, Inc., Hsin Chu City (TW)

( * ) Notice: Subject to any disclaimer, the term of this patent is extended or adjusted under 35 U.S.C. 154(b) by 105 days.

(21) Appl. No.: 15/002,385

(22) Filed: Jan. 20, 2016

(65) Prior Publication Data

US 2017/0206298 A1    Jul. 20, 2017

(51) Int. Cl.
    *G06F 17/50* (2006.01)

(52) U.S. Cl.
    CPC ...... *G06F 17/5072* (2013.01); *G06F 17/5036* (2013.01); *G06F 17/5077* (2013.01)

(58) Field of Classification Search
    CPC ............. G06F 17/5022; G06F 17/5072; G06F 17/5077
    USPC ............... 716/122, 123, 124, 125, 131, 132; 703/16
    See application file for complete search history.

(56) References Cited

U.S. PATENT DOCUMENTS

| | | | | |
|---|---|---|---|---|
| 5,319,743 A * | 6/1994 | Dutta | ................. | G06F 17/5081 345/441 |
| 6,006,027 A * | 12/1999 | Downey | ............. | G06F 17/5022 703/16 |
| 7,689,954 B2 * | 3/2010 | Zhang | ................. | G06F 17/5031 716/113 |
| 9,697,326 B1 * | 7/2017 | Bowman | ............. | G06F 17/5086 |
| 2006/0143202 A1 * | 6/2006 | Parker | | |
| 2007/0277134 A1 * | 11/2007 | Zhang | ................. | G06F 17/5031 716/113 |
| 2010/0052778 A1 * | 3/2010 | Baranauskas | ....... | H03F 3/45085 330/109 |

OTHER PUBLICATIONS

Po-Hung Lin, Yao-Wen Chang and Shyh-Chang Lin; "Analog Placement Based on Symmetry-Island Formulation"; IEEE Transations on Computer-Aided Design of Integrated Circuits and Systems, vol. 28, No. 6, Jun. 2009.
Po-Hung Lin, Shyh-Chang Lin; "Analog Placement Based on Hierarchical Module Clustering"; DAC 2008, Jun. 8-13, 2008, Anaheim, California, U.S.A.; Copyright 2008 ACM 978-1-60558-115-06/08/0006 . . . 5.00.

* cited by examiner

*Primary Examiner* — Phallaka Kik
(74) *Attorney, Agent, or Firm* — Chih Feng Yeh; Huntington IP Consulting Co., Ltd.

(57) ABSTRACT

A method for analog circuit placement is proposed. The method comprises inputting a plurality of modules, a netlist and a constraint file. Next, it is performing a step of establishing a QB-tree construction. Then, a node perturbation of QB-tree is performed after establishing the QB-tree construction. Subsequently, it is performing a step of a look-ahead constraint checking to check whether meet constraints of the constraint file or not, followed by performing a QB-tree packing when meet constraints of the constraint file. Next, it is performing a process of performing a cost evaluation.

12 Claims, 4 Drawing Sheets

METHOD FOR ANALOG CIRCUIT PLACEMENT

TECHNICAL FIELD

The present invention relates to an analog placement, and more particularly, to a method for analog circuit placement according to QB-tree representation.

BACKGROUND OF RELATED ART

Analog designs are quite different from digital designs from a layout perspective. Unlike a large-scale digital design, an analog design usually has a relatively small scale, i.e., an analog circuit typically has a relatively small die size. However, its physical behavior is very sensitive to the layout geometry, e.g., parasitic coupling effect, small signal transmission, wiring crossovers, etc. Hence, area minimization is usually not a concern for an analog design. A digital designer can leverage mature commercial EDA tools to automate layout generation. However, the existing and popular way to generate an analog layout is far from automatic. The manual, time-consuming, error-prone task highly depends on the layout designer's experience and wit. However, analog design automation has become desirable.

To facilitate the automatic analog layout generation, the designer's expertise can be translated to topological constraints. Three symmetry constraints, i.e., device matching, device mirroring, and device proximity constraints, for analog device placement are proposed in the prior art.

The device matching constraint is created for the devices that can share common gate or should be placed closely. The device mirroring constraint is used on two devices that have to be placed symmetrically to avoid parasitic mismatches. For the devices with the same functionality, the device proximity constraint restricts them to be placed together.

The parasitic mismatch between two devices can be minimized by the device matching constraint, the device mirroring constraint, and the device proximity constraint cited above. For example, if the signal paths going out of and coming into the symmetry constrained modules are not symmetric, mismatches might occur and may cause the circuit failure. Therefore, the constraints cited above are commonly adopted in the analog design automation.

Placement is one of the most important processes in layout synthesis for modern analog and mix-signal circuit designs. It determines all the module positions while minimizing the total design area and wire length while satisfying all the user-specified placement constraints for better circuit performance. Although automatic placement techniques are well developed and commonly used for digital circuits, most analog layout designs are still a manual, time-consuming, and tedious task today. The main reason is that the placement of analog layout synthesis must consider numerous complex constraints to reduce the impacts of mismatches, parasitics, and process variations on circuit performance.

However, most previous works focused on a limited subset of these constraints rather than consider all the constraints simultaneously. Several geometrical constraints handling such as the preplaced constraints can be further improved. Therefore, the present invention proposes a new representation to achieve the time complexity lower bound for module packing, avoid redundant perturbations and speed up the whole simulated annealing process as the new representation can maintain geometrical information in itself.

SUMMARY

In this invention, a method for analog circuit placement is proposed. The method for analog circuit placement is executed in a computer to perform a layout for an analog circuit. The method comprises inputting a plurality of modules and a constraint file. Next, it is performing a step of establishing a QB-tree construction by combining a B*-tree and a quadtree based-on the plurality of modules and constraint file. Then, a node perturbation of QB-tree is performed after establishing the QB-tree construction. Subsequently, it is performing a step of a look-ahead constraint checking to check whether meet constraints of the constraint file or not, followed by performing a QB-tree packing when meet constraints of the constraint file. Next, it is performing a cost evaluation to guide a simulated annealing process.

According to one aspect, the method further comprises a process of a second checking to check whether meet termination conditions or not. When meet constraints of the constraint file, placement result is obtained after the second checking.

According to another aspect, the constraint file includes locations of preplaced modules.

According to one aspect, the B*-tree is an ordered binary tree representing a compacted placement, in which every module cannot move left or bottom. The quadtree is a tree data structure which each internal node has exactly four quadrants.

According to one aspect, the look-ahead constraint checking is transferring QB-tree 1 to QB-tree 2.

According to one aspect, when does not meet constraints of the constraint file in the first and the second checking, back to perform a node perturbation of QB-tree.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In this invention, a new scheme of a hybrid representation (QB-tree) combining the B*-tree and the quadtree for analog placements to handle various geometrical constraints is proposed. Based on binary trees and the hierarchy structure of quadtree, the QB-tree is very efficient, effective and flexible for analog placements with various geometrical constraints. QB-tree corresponds to a simulated result of layout of analog circuit. Firstly, the placement-aware space partitioning is performed and the QB-tree is constructed, then look-ahead constraint checking is applied and followed by analog placement algorithms. Experimental results show that based on the proposed representation, the results can achieve full constraint handling and outperform the state-of-the-art analog placers in both wirelength and design area for industrial designs.

The method is executed in a computer to perform a layout for an analog circuit which may be described by a set of devices and wires connected thereon. The constraints can be done by designers or by automatic pattern recognition. In other embodiments, the design constraints can be stored in another file other than the Simulation Program with Integrated Circuit (SPICE) file for the analog circuit.

Analog placements assign cells to positions on the chip, such that no two cells overlap with each other (legalization) and some cost functions (e.g., wirelength) are optimized. It can be found the best position for each module on the chip according to appropriate cost functions. Modules need to be placed properly to reduce parasitic mismatches and circuit sensitivities to thermal gradients or process variations for better electrical effects and higher performance. For example, geometrical analog placement constraints, such as symmetry constraint, proximity constraint, pre-placed constraint, fixed-boundary constraint, boundary constraint and minimum separation constraint may be considered. Other considerations may include wirelength, routability/channel density, power, timing, thermal, I/O pads, manufacturability, etc.

Symmetry constraints are specified to place pairs of modules symmetrically with respect to several common axes. Placing modules satisfying symmetry constraints can reduce parasitic mismatches which may cause higher offset voltages or degrade power-supply rejection ratio. Additionally, it also can reduce the circuit sensitivity to thermal gradients. Mirrored placement is with respect to the vertical or horizontal symmetry axis. Proximity constraints are specified to place pair of modules in close proximity with specified maximum distance to reduce the impact of local variations during the fabrication, which may result in performance degradation. Preplaced constraints are specified to restrict some modules to be placed at pre-specified locations with fixed orientations for performance specifications. Fixed-boundary constraints are specified so that the analog placement region could become irregular with multiple concave or convex shapes along the boundaries. Preplaced (fixed-boundary) constraints are specified to place some modules (e.g., embedded memories and Intellectual Property modules) at pre-specified locations with fixed orientations in order to meet performance specifications. Boundary constraints are specified to arrange the modules with input or output ports to be placed on the boundaries of the placement region for better routability and avoid some unwanted routing parasitics, and place modules to be placed at boundaries of the symmetry island, and place modules to be placed near the boundaries of the placement region with given distance bounds. Minimum separation constraints are specified to place pairs of modules with specified minimum/maximum distance from all other modules. One of the reasons for the minimum separation constraints is to keep the space for guard rings in order to prevent latch-up for some noisy modules (devices), and further reduce coupling from inductors, capacitors and interconnects, and prepare separations for routing.

In this invention, the QB-tree representation is proposed to enhance the geometrical constraint handling in the representation. The construction scheme of QB-trees is firstly introduced and then the packing schemes are presented. As noted above, the QB-trees is made by combining the B*-tree and the quadtree for analog placements.

A B*-tree is an ordered binary tree representing a compacted placement, in which every module cannot move left or bottom anymore. The coordinate of each module can be calculated by a pre-order tree traversal on the B*-tree. Suppose the module bi, represented by the node ni, has the bottom-left coordinate (xi; yi), the width wi, and the height hi. Then for the left child, nj, of ni, $x_j=x_i+w_i$; for the right child, nk, of ni, $x_k=x_i$. To calculate the y-coordinates, it adopts a contour structure which records the contour line in the current compaction direction (Y.-C. Chang, Y.-W. Chang, G.-M. Wu and S.-W. Wu, \B*-trees: A New Representation for Non-slicing Floorplans, "Proc. Of DAC, June 2000). Using a doubly-linked list to implement the contour structure, the total packing time is amortized linear to the number of modules.

A quadtree is a tree data structure which each internal node has exactly four children (quadrants). Commonly used to describe a class of hierarchical data structures, quadtrees have the common property that they are based on the principle of recursive decomposition of region, where decomposed regions may be either equal or unequal in each level. Quadtrees are widely adopted to stored point data, regions, curves, surfaces, and volumes in the domains of computer graphics, image processing, computational geometry, geographic information systems, and robotics.

Given a placement region with a set of preplaced modules $P=\{p_1, p_2, \ldots, p_n\}$, one region is recursively sliced into four disjoint sub-regions with one vertical slice line and one horizontal slice line along the preplaced modules' boundaries. To prevent from generating sub-regions of too large/small aspect ratios, interval trees are constructed and three cost functions are introduced to choose slice lines with different weights in each recursion. For each preplaced module $p_i \in P$, the left, right, bottom, and top boundaries of the preplaced module i are denoted as $x_{i,1}$, $x_{i,r}$, $y_{i,b}$, and $y_{i,t}$, respectively. $V=\{x_{1,l}, x_{2,l}, \ldots, x_{n,l}\} \cup \{x_{1,r}, x_{2,r}, \ldots, x_{n,r}\}$, and $H=\{y_{1,b}, y_{2,b}, \ldots, y_{n,b}\} \cup \{y_{1,t}, y_{2,t}, \ldots, y_{n,t}\}$ are defined as the vertical and horizontal slice line candidates. Assume that $C_i$ is the cost function of choosing a slice line i, $R_i$ is the number of preplaced modules crossed by the slice line i, $D_{i,j}$ is the edge difference of a module j caused by the slice line i, and $F_i$ is the distance difference of closest modules on top/down (left/right) sides of slice line i, the cost function $C_i$ can be defined as follows:

$$C_i = \alpha R_i + \beta D_{i,j} + \gamma F_i$$

Figure 1A:
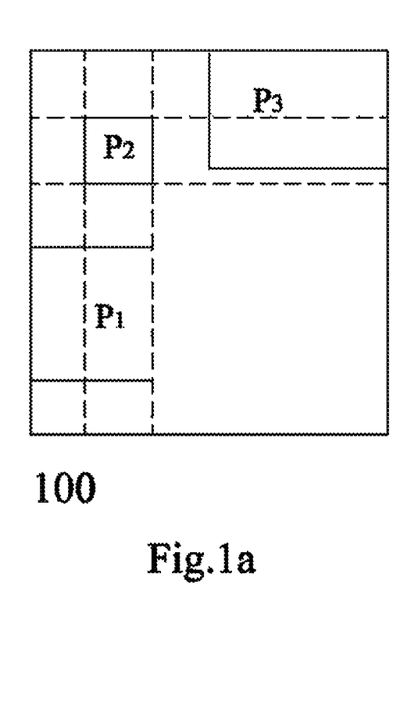
FIGS. 1*a* to 1*c* show an example of the slice line configuration and the cost calculation according to an embodiment of the invention.
Figure 1B:
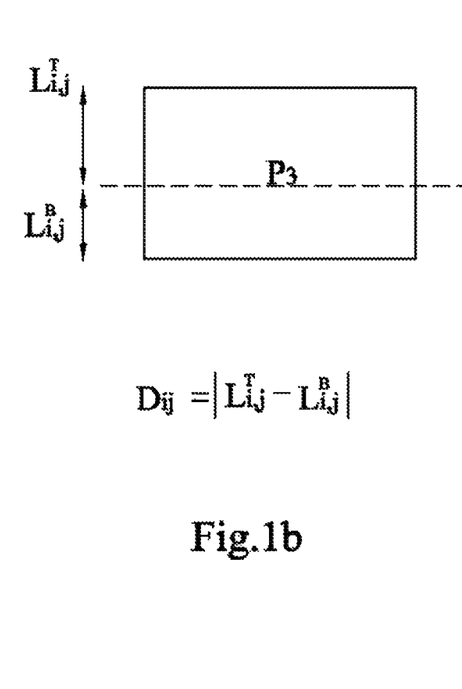
Figure 1C:
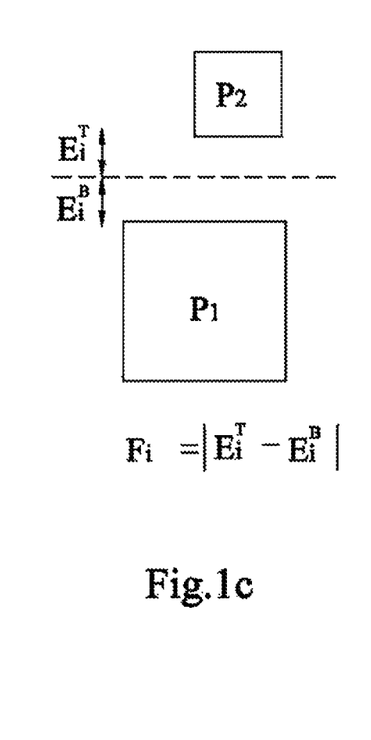

The cut lines of a region 100 can be obtained by choosing one vertical cut line candidate and one horizontal cut line candidate with the minimum cost, shown in FIG. 1a. For example, FIGS. 1a to 1c show an example of the slice line configuration and the cost calculation. The slice lines abut the boundaries of the preplaced modules $\{p_1, p_2, p_3\}$, shown in FIG. 1a. $L^T_{i,j}$ and $L^B_{i,j}$ are the edge lengths and $D_{i,j}$ is the difference of these two lengths, shown in FIG. 1b. $E^T_i$ and $E^B_i$ are the distances between the slice line and the closest modules on top/down (left/right) sides of slice line i and $F_i$ is the difference of these two distances, shown in FIG. 1c. The construction of a QB-tree is divided into two stage, the quadtree construction stage followed by the B*-tree connection stage. In the quadtree construction stage, the placement region is partitioned according to the heuristic above and the boundary coordinates of regions are stored in the quadrants. Initially the whole placement region corresponds to the root node of the quadtree, and each sub-region is recursively partitioned into four sub-regions until each preplaced module corresponds to one leaf quadrant in the quadtree.

Figure 2A:
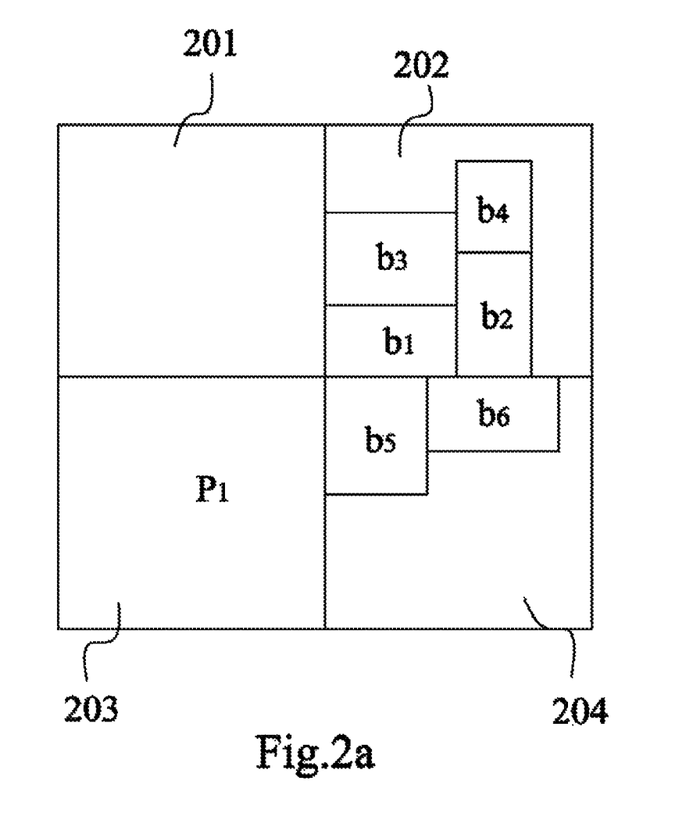
FIGS. 2*a* to 2*b* show an example of the QB-tree construction according to an embodiment of the invention.
Figure 2B:
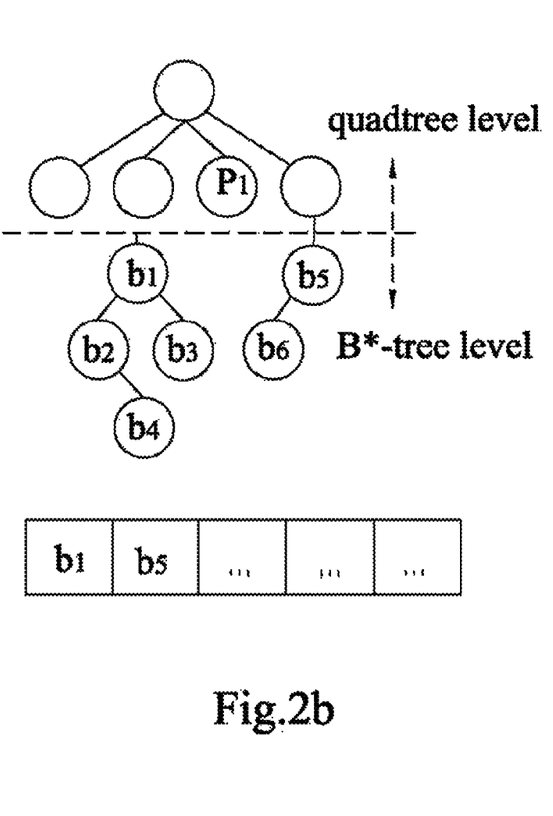

FIGS. 2a to 2b show an example of the QB-tree construction. Take FIG. 2a as an example for easier explanation, the whole partition process finish in one recursion after preplaced module $p_1$ corresponds to one leaf quadrant in the quadtree. FIG. 2a shows a placement region with one preplaced module $p_1$ and six modules $b_1$ to $b_6$. The placement region is partitioned into left upper quadrant 201, right upper quadrant 202, left lower quadrant 203 and right lower quadrant 204. According to the principle of recursive decomposition of quadtree, the placement regions can be modeled in the representation. The root node and its four quadrants in FIG. 2b show the corresponding QB-tree configuration so far. In the B*-tree connection stage, B*-tree nodes are connected to the non-preplaced leaf quadrants and the QB-tree construction is then finished. FIG. 2b shows the corresponding QB-tree configuration.

Given a QB-tree, the QB-tree is initially traversed once in the Depth-first search (DFS) order and all the B*-tree nodes are stored which are connected to leaf quadrants in an array. B*-tree based placement flow can mainly be divided into two stages, one for perturbation on the tree configuration, another for packing according to the configuration. Depth-first search (DFS) is an algorithm for traversing or searching tree data structures. One starts at the root (selecting some arbitrary node as the root) and explores as far as possible along each branch before backtracking. Following the order, B*-tree is packing from the coordinates stored in the quadrants similar to the original B*-tree. Note that the starting coordinates of one B*-tree is the coordinates where the vertical and horizontal slice lines cross. In FIG. 2 (b), starting from the root node following the DFS order, the QB-tree is traversed and B*-tree packing is performed from $b_1$ and $b_5$ for quadrants denoted in reference number 202 and 204, respectively. It should be noted that no module is packed for quadrants denoted in reference number 201 because no B*-tree node is connected to it.

Figure 3:
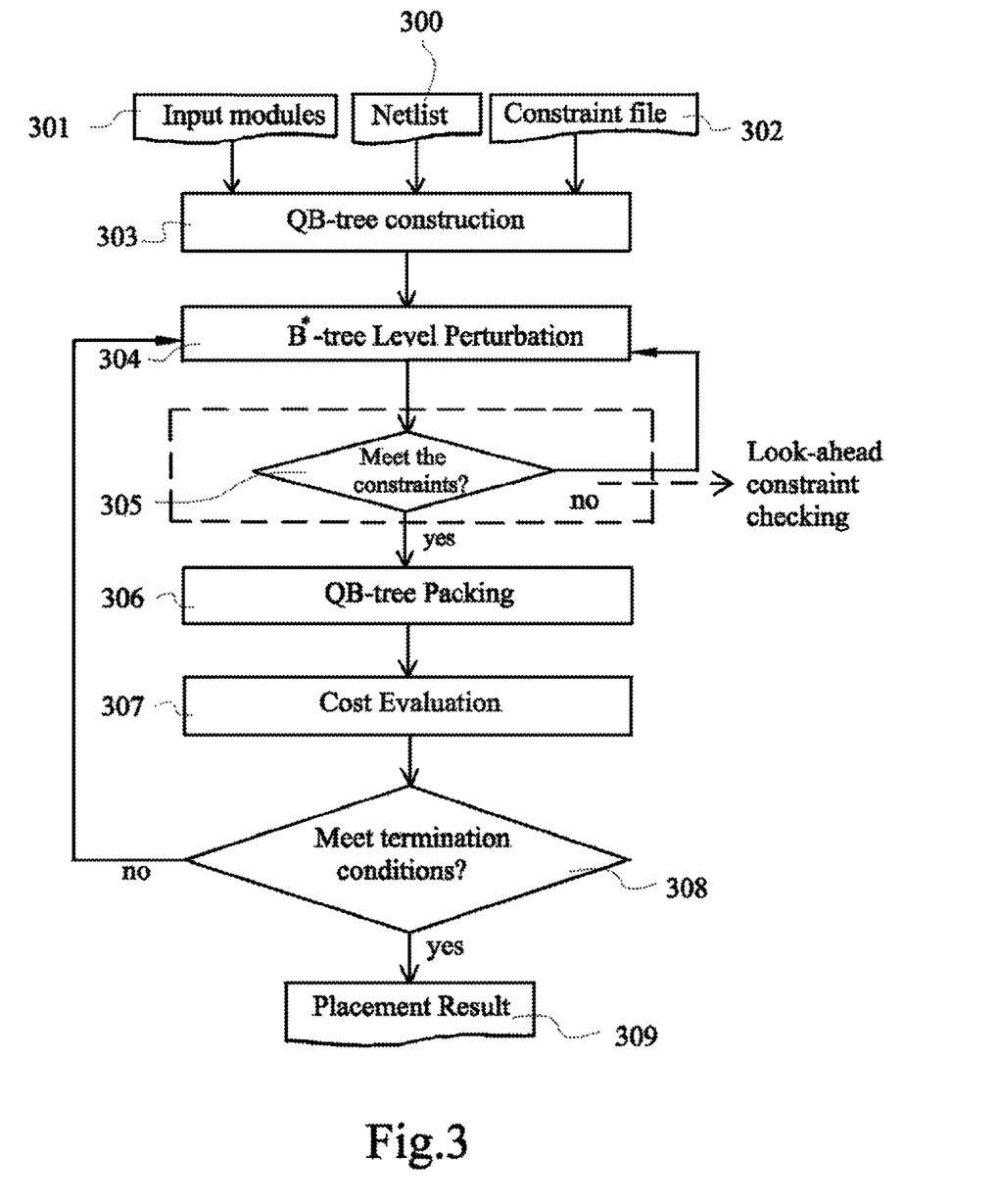
FIG. 3 illustrates the placement flow of QB-tree according to an embodiment of the invention.

Referring to FIG. 3, it illustrates the placement flow of QB-tree which describes a process flow of a method for analog circuit placement in the invention. The analog circuit placement is executed in a computer to perform a layout for an analog circuit described by QB-trees representation. In FIG. 3, it illustrates an overview of the invention's placement algorithm, and introducing how to handle the constraints with QB-trees both before and during packing. In this invention, QB-trees can avoid redundant operations before packing because the representation can maintain geometrical information in itself. The method for analog circuit placement in the invention comprises a step of preparing/inputting a plurality/set of input modules (cells) 301, a netlist 300 and a constraint file 302 including locations of preplaced modules. For example, the netlist 300 may be described in a Simulation Program with Integrated Circuit Emphasis (SPICE) format, and the design constraints are annotated into the netlist. The netlist 300 may be related with the cost evaluation and irrelevant with QB-tree construction. The constraint file 302 may have design constraints of a device or an analog circuit. Then, QB-tree construction 303 is created/finished based-on the input modules 301 and constraint file 302. After the QB-tree construction 303 is generated, B*-tree level perturbation 304 is performed by perturbing the initial QB-tree. That is, node perturbation of QB-tree is performed. Then, look-ahead constraint checking 305 is performed to check whether meet the constraints of the constraint file 302 or not. That is, pre-checking step 305 is transferring QB-tree 1 (the initial QB-tree) to QB-tree 2. If meet the constraints, then performing the QB-tree packing 306 which locates all the modules based on the rules presented earlier. If not meet the constraints (constraints conflict), then the process is back to the B*-tree level perturbation 304. QB-tree can maintain geometrical information in the tree structure and perform look-ahead constraint checking after each perturbation. After the QB-tree packing 306 is finished, result (value) of the second constraint checking will be applied to a simulated annealing process and without entering the perturbation procedure of QB-tree. Thus, after the QB-tree packing 306 is finished, the cost evaluation (calculation) 307 is then performed to guide the simulated annealing process. After the cost evaluation 307 is finished, it is performing a step 308 to check whether meet termination conditions or not. If meet the termination conditions, then the placement result 309 is obtained. If not meet the termination conditions, then the process is back to the B*-tree level perturbation 304. By simulated annealing, the B*-tree nodes of QB-tree keep perturbing and the best solution is recorded until predefined termination conditions are met.

In the present invention, when handling preplaced constraints, instead of checking the overlaps in each packing using the corner stitch data structure, the placement region is partitioned into rectangular regions so the packing of QB-tree automatically avoids the preplaced modules and no preplaced constraint checking is needed. As a result, the preplaced constraints are handled in the QB-tree representation directly. Given a QB-tree of m quadrants, n B*-tree nodes and k preplaced modules, as indicated in the packing scheme, by storing the root B*-tree nodes in an array, the complexity of packing modules with preplaced constraints from O(nk) to O(n) can be improved, which achieves the time complexity lower bound for module packing algorithm with preplaced constraints. The packing scheme of QB-tree of the invention can reduce the time complexity of packing with preplaced modules from O(nk) to O(n+m), and further reduce the time complexity from O(n+m) to O(n) by keeping an array to store the roots of each B*-tree, wherein n is the number of modules, k is the number of preplaced modules m is the number of quadrants.

Based on the new representation of the invention, a look-ahead constraint checking technique is proposed. The additional constraint checking is performed before packing to avoid redundant perturbations, reduce redundant solutions during the perturbation stage in QB-tree and leads to faster convergence of simulated annealing. In the look-ahead constraint checking, both the proximity constraints and the boundary constraints can be handled. For the proximity constraints, if two modules with proximity constraints are placed in quadrants which are far away from each other, the packing time can be saved by skipping the packing based on the current tree structure because these two modules won't be in close proximity after packing and the trees keep perturbing until the constraints are satisfied. Besides, the boundary constraints can be also handled by confining modules with boundary constraints to be placed along the boundaries quadrants of the placement region.

Figure 4A:
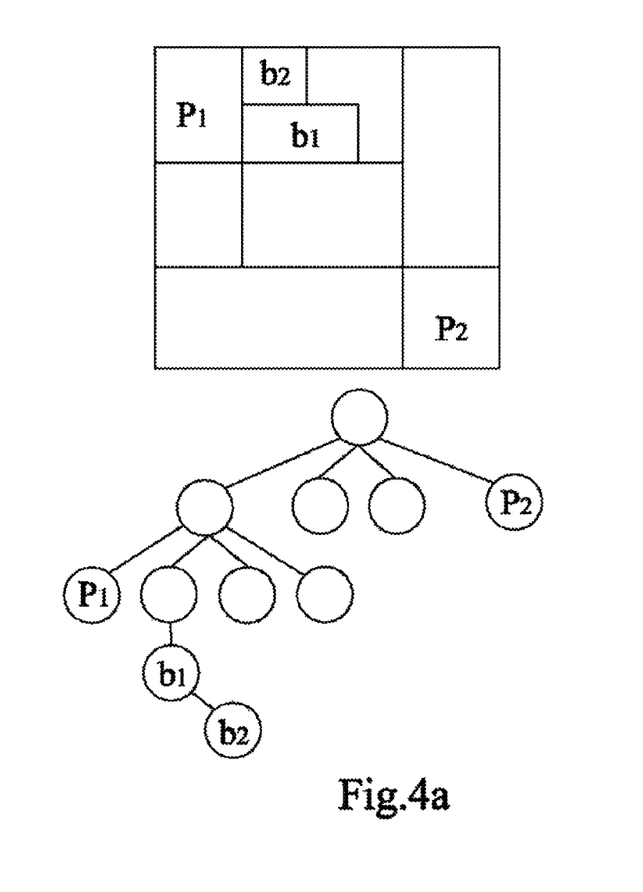
FIG. 4*a* shows a simple example of a QB-tree configuration according to an embodiment of the invention.
Figure 4B:
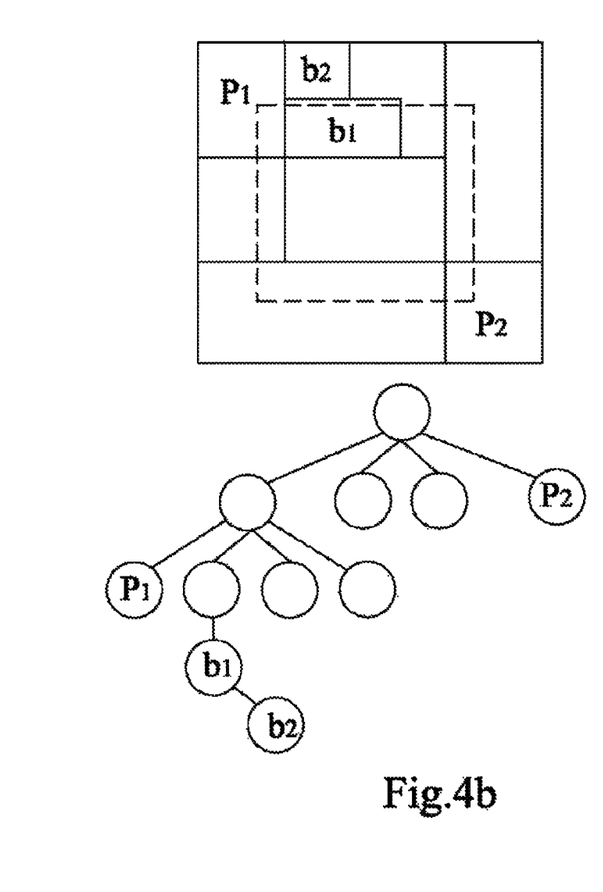
FIG. 4*b* shows a simple example of a QB-tree configuration according to another embodiment of the invention.

FIG. 4a shows a simple example of a QB-tree configuration in which the module $b_1$ and $b_2$ are placed in the same quadrant and thus the proximity constraints are not violated. Proximity constraints place the constrained pair of modules in closed quadrants. FIG. 4b shows a simple example of a QB-tree configuration in which the module $b_2$ (module with boundary constraints) are placed in the boundary quadrant and thus the boundary constraints are not violated. Boundary constraints place the constrained modules in boundary quadrants. All leaf quadrants except for the one representing the center sub-region are boundary sub-regions. Both BQ-tree configurations will pass the look-ahead constraint checking and continue to the packing.

Definition of proximity constraints is distance between a pair of blocks should be smaller than a predefined separation value, and definition of range constraints is the lower left corner of one block should be placed within a predefined moving region (Y.-C. Tam, E. F.-Y. Young and C. Chu, "Analog Placement with Symmetry and Other Placement Constraints," Proc. of ICCAD, November 2006). HB*-tree oversimplifies the solution space since blocks in one hierarchy node do not necessarily satisfy the constraint (P.-H. Lin, Y-W. Chang and S.-C. Lin, "Analog Placement Based on Hierarchical Module Clustering," Proc. of DAC, June 2008). Definition of boundary constraints is distance between a block and the four boundaries of the placement region should be smaller than a predefined separation value. Different definitions of the boundary constraints refer to this terminology (C.-W. Lin, J.-M. Lin, C.-P. Huang and S.-J. Chang, "Performance-Driven Analog Placement Considering Boundary Constraint," Proc. of DAC, June 2010).

The time complexity of the symmetry constraints and the minimum separation constraints is O(n), and n is the number of modules. A new packing scheme is proposed for combining the ASF-B*-tree and the HB*-tree to guarantee a feasible placement with symmetry constraints by augmenting the hierarchical B*-tree. ASF-B*-tree may be referred to the reference (Po-Hung Lin, Yao-Wen Chang, Member, IEEE, and Shyh-Chang Lin "Analog Placement Based on Symmetry-Island Formulation," IEEE Transaction on computer-aided design of integrated circuits and system, Vol. 28, No. 6, June 2009). In this invention, this technique may be adopted to maintain the time complexity of packing modules to be O(n). Minimum separation constraints adopt a module inflation technique to reserve spacing for modules with minimum separation constraints, which extend the HB*-tree with reserved spacing for guard rings. For the minimum separation constraints, a module inflation technique may be adopted to prepare separations for modules with minimum separation constraints. Furthermore, the guard ring issues may be also considered. Based on the concept of the module inflation technique, separations may be also prepared for guard rings by keeping a same distance from the HB*-tree nodes. Given a QB-tree of n B*-tree nodes with symmetry constraints and minimum separation constraints, the worst-case packing time complexity is O(n).

In the present invention, the simulated annealing based placement algorithm was implemented in the C++ language on a linux platform with a 2.13 GHz Intel Xeon CPU and 24 GB memory. Three sets of experiments are performed. In the first and second sets of experiments, the real industry analog designs are used to compare the invention with the CB-tree with various constraint settings. In the third set of experiments, extensions of the invention are made to handle the guard rings, and compare the results with the manual one with same guard ring spacing settings. In the first set of experiments, the invention is compared with the CB-tree with various constraint settings on an industry design biasynth_2p4g. Table 1 lists the results. The third column gives the number of symmetry groups and the fifth column gives the constraint settings. As shown in Table 1, the invention's QB-tree results in an average CPU time reduction of 82%, an average wirelength reduction of 9% over the CB-tree. It shows the resulting layout of biasynth_2p4g with two preplaced modules, one proximity groups, one boundary modules and one minimum separation module of CB-tree and QB-tree, respectively.

TABLE 1

| circuit | # of Mod. | # of Sym. Groups | Mod. Area | Other Constraints | CB-tree [1] Time | CB-tree [1] DS | QB-tree Time | QB-tree DS |
|---|---|---|---|---|---|---|---|---|
| biasynth_2p4g | 65 | 0 | 589280 | 2 preplace | 41 | 8.98 | 12 | 7.06 |
|  |  | 3 |  | 2 preplace, 1 min-sep, 1 proximity | 40 | 13.2 | 32 | 16.6 |
|  |  | 2 |  | 2 preplace, 1 proximity, 1 boundary, 1 min-sep | 30 | 14.1 | 17 | 9.7 |
|  |  |  |  | comparison | 1.82 | 1.09 | 1.00 | 1.00 |

In the second set of experiments, the invention is compared with the CB-tree with various constraint settings on an industry design ota. Table 2 lists the results. As shown in the table, the invention's QB-tree results in an average CPU time reduction of 18%, an average wirelength reduction of 8% and an average area reduction of 4% over the CB-tree.

TABLE 2

| Circuit | # of Mod. | # of Sym. Groups | Mod. Area | Other Constraints | CB-tree [14] Area | WL | Time | QB-tree Area | WL | Time |
|---|---|---|---|---|---|---|---|---|---|---|
| ota | 54 | 0 | 2.16 | 1 preplace | 2.48 | 743.99 | 18 | 2.56 | 756.02 | 7 |
|  |  | 1 |  | 2 preplace | 2.63 | 659.4 | 10 | 2.54 | 608.05 | 5 |
|  |  | 7 |  | 2 preplace | 3.43 | 550.9 | 9 | 2.37 | 564.22 | 10 |
|  |  | 3 |  | 2 preplace, 1 proximity, 1 min-sep. | 2.54 | 518.38 | 11 | 2.67 | 443.82 | 15 |
|  |  | 7 |  | 2 preplace, 1 fixed boundary, 1 boundary | 2.89 | 676.26 | 12 | 2.38 | 554.57 | 14 |
|  |  |  | Comparison |  | 1.04 | 1.08 | 1.18 | 1.00 | 1.00 | 1.00 |

In the third set of experiments, the invention is compared with the layout provided from the industry using the same guard ring spacing settings. Table 3 shows that the invention's QB-tree results in an area reduction of 83% and wirelength reduction of 10% over the manual layout.

TABLE 3

| Circuit | # of Mod. | # of Sym. Groups | Mod. Area | Manual Layout Area | WL | Layout by QB-tree Area | WL |
|---|---|---|---|---|---|---|---|
| ota | 54 | 3 | 2.16 | 5.26 | 655.19 | 2.87 | 596.17 |
|  |  | Comparison |  | 1.83 | 1.10 | 1.00 | 1.00 |

In this invention, a QB-tree representation is presented, which can maintain geometrical information in the representation and perform constraint checking before packing to avoid redundant operations before packing. A QB-tree offers much higher efficiency and quality among existing works for the analog placement problem with all the addressed constraints. Experimental results have shown that the new representation achieves the best solution quality and consume the least running time for real industrial designs.

The main contributions of this invention are summarized as follows:

(a) The present invention is achieving the time complexity lower bound for module packing with all the proposed constraints.
(b) A placement-aware space partitioning heuristic is proposed to divide the whole placement region into large sub-regions based on the geometry of preplaced modules. Preplaced and fixed-boundary constraints might be modeled and handled in the representation.
(c) A hybrid representation (QB-tree) combining quadtree and B*-tree is developed to enhance the geometrical constraint handling in the representation.
(d) A revised placement flow with look-ahead constraint checking after each perturbation is introduced. By identifying and avoiding the infeasible solutions, the packing time and the convergence time of simulated annealing can be reduced.
(e) Experimental results show that the proposed methods outperform the existing work on both wire length and design area for real industry designs under various constraints.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method for analog circuit placement which is executed in a computer to perform a layout for an analog circuit, the method comprising:
   using the computer to perform the following:
   inputting a plurality of modules of said analog circuit, a netlist of said analog circuit and a constraint file of said analog circuit;
   creating a QB-tree construction by combining a B*-tree and a quadtree based-on said plurality of modules and said constraint file;
   performing a node perturbation of said QB-tree;
   performing a look-ahead constraint checking to check whether constraints of said constraint file are met or not;
   performing a QB-tree packing when said constraints of said constraint file are met; and
   performing layout for said analog circuit by performing a cost evaluation to guide a simulated annealing process using said packed QB-tree.

2. The method of claim 1, wherein said constraint file includes locations of preplaced modules.

3. The method of claim 1, wherein said constraint file has design constraints of an analog circuit.

4. The method of claim 3, wherein said B*-tree is an ordered binary tree representing a compacted placement, in which every module cannot move left or bottom.

5. The method of claim 3, wherein said quadtree is a tree data structure in which each internal node has exactly four quadrants.

6. The method of claim 1, wherein proximity constraints and boundary constraints of said constraints can be handled in said look-ahead constraint checking.

7. The method of claim 1, when said constraints of said constraint file are not met, said method goes back to perform a node perturbation of said QB-tree.

8. The method of claim 1, wherein said netlist is described in a Simulation Program with Integrated Circuit Emphasis (SPICE) format.

9. The method of claim 1, further comprising performing a process of a second checking to check whether termination conditions are met or not.

10. The method of claim 9, when said termination conditions are not met, said method goes back to perform a node perturbation of said QB-tree after said second checking.

11. The method of claim 9, when meet said termination conditions are met, placement result is obtained after said second checking.

12. The method of claim 1, wherein said constraints include symmetry constraint, proximity constraint, pre-placed constraint, fixed-boundary constraint, boundary constraint or minimum separation constraint.

* * * * *